United States Patent [19]

Nowobilski et al.

[11] Patent Number: 4,514,450

[45] Date of Patent: Apr. 30, 1985

[54] PEG SUPPORTED THERMAL INSULATION PANEL

[75] Inventors: Jeffert J. Nowobilski, Orchard Park; William J. Owens, Kenmore, both of N.Y.

[73] Assignee: Union Carbide Corporation, Danbury, Conn.

[21] Appl. No.: 547,622

[22] Filed: Nov. 1, 1983

[51] Int. Cl.³ .............................. B32B 7/00
[52] U.S. Cl. .................... 428/120; 52/811; 220/445
[58] Field of Search ............ 428/117–119, 428/120; 52/811; 220/445

[56] References Cited

U.S. PATENT DOCUMENTS

| | | |
|---|---|---|
| 2,296,392 | 9/1942 | Marchant .............................. 52/443 |
| 2,745,173 | 5/1956 | Janos .................................. 29/455 R |
| 3,094,071 | 6/1963 | Beckman .............................. 220/422 |
| 3,161,265 | 12/1964 | Matsch et al. .................... 52/804 X |
| 3,168,817 | 2/1965 | Beckman et al. ....................... 62/45 |
| 3,199,715 | 8/1965 | Paivanas ............................... 220/423 |
| 3,289,423 | 12/1966 | Berner et al. .................. 220/441 X |
| 3,936,553 | 2/1976 | Rowe ............................... 428/119 X |

*Primary Examiner*—Henry F. Esptein
*Attorney, Agent, or Firm*—Stanley Ktorides

[57] ABSTRACT

A thermal insulation panel which is lightweight, load bearing, accommodates thermal stress, and has excellent high temperature insulation capability comprising high performance insulation between thin metal walls supported by high density, high strength glass pegs made in compliance with specified conditions of time, temperature and pressure.

14 Claims, 2 Drawing Figures

PEG SUPPORTED THERMAL INSULATION PANEL

The Government has rights in this invention pursuant to Contract No. De-AC02-80ET25426 awarded by the U.S. Department of Energy.

TECHNICAL FIELD

This invention relates to insulation panels which can be employed to insulate a high temperature enclosure and which can also bear a load.

BACKGROUND ART

The recent sharp rise in the cost of gasoline has instigated a search for alternative methods to power automobiles. One such alternative method is electricity provided by one or more newly developed high temperature batteries. However, such batteries require an insulated enclosure or their efficiency will be reduced to unacceptable levels.

Insulation panels to be used to construct such an enclosure must satisfy a number of criteria. Because of the high temperatures involved on the inside of the enclosure, which are on the order of 800° F., the insulation panel must have excellent high temperature insulating qualities and not degrade either physically or in terms of heat resistance capability upon exposure to such high temperatures or due to the stress imposed by the temperature difference between such high temperatures on one side of the panel and the ambient temperatures on the other side of the panel.

Another criteria which must be satisfied by insulation panels in order to be suitable for use to construct high temperature battery enclosures is load bearing capability. This is because the insulation of the high temperature battery is greatly abetted by a vacuum space between the high temperature battery and the ambient conditions. Such a vacuum results in a load upon the insulation panel of atmospheric pressure of about 15 pounds per square inch (psi). This is in addition to any other load the insulation panel might have to bear due to the limited space available on a vehicle for battery placement which might necessitate the use of such insulation panel as a platform to support other weighty accouterments of an electric vehicle.

A further criterion necessary for suitable insulation panels is that they be light in weight. Heavy insulation panels would work to defeat the purpose of an electric powered vehicle wherein light weight is of prime importance.

In summary, insulation panels suitable for use to insulate a high temperature battery enclosure must have excellent high temperature insulating qualities, must be able to withstand the stress caused by extreme temperature difference between the sides of the panel, must be able to bear a significant load, and must be light in weight. Unfortunately, in general, material qualities which impart to insulation ability to address any one of the above criteria tend also to reduce the ability of the insulation to adequately perform to meet one or more of the other criteria. For example, material qualities which increase the insulation's load bearing capability also tend to increase its weight and decrease its insulation capacity.

Insulation which can be used to form an enclosure is known. For example, U.S. Pat. No. 3,094,071—Beckman discloses a double-walled tank for cryogenic fluids wherein the space between the walls is evacuated and the walls are supported by spacers made of ceramic or thermal-setting plastic reinforced with fabric or paper. U.S. Pat. No. 3,289,423—Berner et al teaches the use of pegs made by gluing together layers of glass fibers to support vacuum insulated panels. U.S. Pat. No. 3,161,265—Match et al teaches pegs of glass reinforced phenolic resin to prevent wall deformation in a heat insulating vacuum panel. This patent suggests that ceramic pegs be used when high temperatures are involved.

None of the known enclosure forming insulation, such as those described above, are satisfactory for use to construct a high temperature battery enclosure for an electric vehicle. This is not surprising since the need for such an enclosure has only recently arisen. High density support pegs such as those made of ceramics have the disadvantage of relatively high thermal conductivity at elevated temperatures. To reduce heat transfer, the peg support area must remain small, thereby diminishing load bearing capability. Pegs containing binders or resins provide a continuous conductive heat path thus reducing insulating performance. Moreover, such binders or resins may give off vapors at elevated temperatures thereby degrading the vacuum and further reducing insulating performance.

It is therefore an object of this invention to provide an insulation panel having excellent high temperature insulating qaulities.

It is a further object of this invention to provide an insulation panel which can easily withstand the stress imposed by relatively large temperature differences on either side of the panel.

It is still a further object of this invention to provide an insulation panel which is capable of bearing a significant load.

It is yet another object of this invention to provide an insulation panel which is relatively light in weight.

SUMMARY OF THE INVENTION

The above and other objects which will become apparent to one skilled in the art upon a reading of this disclosure are attained by the insulation panel of this invention, one aspect of which is:

An insulation panel suitable for use to insulate a high temperature enclosure comprising two spaced, aligned, thin metal sheets of identical surface area, said metal sheets spaced by a plurality of insulation pegs having a density of from 30 to 80 pounds per cubic foot and produced by a process comprising:
  (a) providing a stack of substantially binderless glass fiber sheets in an amount sufficient to achieve an insulation peg of desired density from 30 to 80 pounds per cubic foot;
  (b) providing a press to compress the stack;
  (c) heating the stack and the press to a temperature in the range of from the glass strain temperature to less than the glass softening temperature for a time period sufficient to achieve thermal equilibrium of the stack and the press surface;
  (d) thereafter compressing the stack by applying a light vertically compressive force of from 2.0 to 20.0 pounds per square inch to the stack for a time period sufficient to produce said desired density and to substantially relieve stress within the compressed stack;
  (e) cooling the compressed glass fiber stack to ambient temperature;

said pegs covering from 4 to 30 percent of said surface area and oriented such that the glass fibers are parallel to said metal sheets, with the remaining space between said metal sheets filled with high performance insulation.

Another aspect of the insulation panel of this invention is:

An insulation panel suitable for use to insulate a high temperature enclosure comprising two spaced aligned, thin metal sheets of identical surface area, said metal sheets spaced by a plurality of insulation pegs having a density of from 30 to 80 pounds per cubic foot comprised of non-sintered glass fibers and essentially devoid of binder material, said pegs covering from 4 to 30 percent of said surface area and oriented such that the glass fibers are parallel to said metal sheets, with the remaining space between said metal sheets filled with high performance insulation.

As used herein the term "high performance insulation" means insulation having thermal conductivity less than 0.1 BTU/hr.ft. °F., such as Johns Manville Min-k and Union Carbide Superinsulations.

As used herein the term "sinter" means to cause to become a coherent porous mass by heating without melting.

As used herein the term "binder material" means any material which is used to hold the individual glass fibers together.

As used herein the term "vertically compressive force" means a force vertical with respect to the stack. Although the stack will generally be oriented vertically with respect to the horizontal ground surface, this is not absolutely necessary and the stack may be oriented at any angle to the horizontal.

As used herein the term "press" means any means which can impart a compressive force to the glass fiber stack.

As used herein the term "press surface" means that portion of the press that is intended to contact the stack.

As used herein the term "glass strain temperature" means the temperature at which the glass internal stress is reduced to a commercially acceptable value in about 4 hours. This point corresponds to a glass viscosity of $10^{14.5}$ poises when measured by ASTM No. C336 or C598.

As used herein the term "glass annealing temperature" means the temperature at which the glass internal stress is reduced to a commercially acceptable value in about 15 minutes. This point corresponds to a glass viscosity $10^{13}$ poises when measured by ASTM No. C336 or C598.

As used herein the term "glass softening temperature" is the temperature at which a uniform glass fiber, 0.55 to 0.75 millimeters in diameter and 23.5 centimeters long, elongates under its own weight when the upper 10 centimeters is heated in the manner prescribed by ASTM No. C338.

As used herein the term "thermal equilibrium" means that state when the temperatures of all points within a body are within ten percent of the mean temperature of that body.

As used herein the term "peg" means a column whose height or length (L) is significant when compared to its diameter or lateral dimension (D). In quantitative terms, a cylinder is a peg if its ratio of diameter to length, or aspect ratio, (D/L) is less than 2. A rectangular parallelpiped is a peg if its aspect ratio D/L is less than the square root of pi, where D is the square root of the surface area of a lateral cross-section of the parallelpiped, which would be the length of one side of a square cross section. The peg cross section may be any other suitable shape such as a triangle, a pentagon, a hexagon, etc.

DETAILED DESCRIPTION

The thermal insulation panel of this invention will be described in detail with reference to the drawings.

Figure 1:
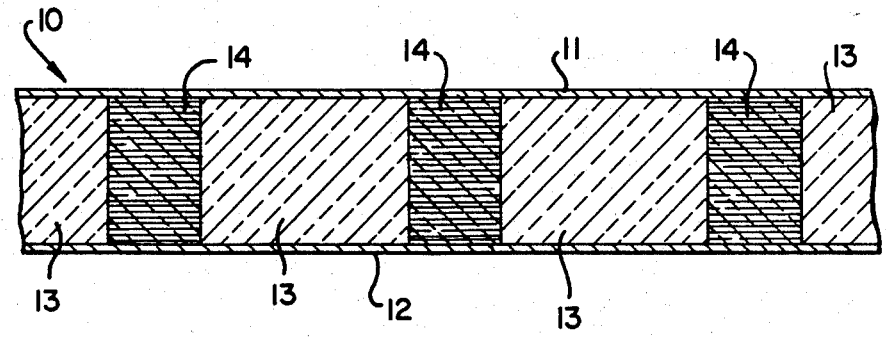
FIG. 1 is a cross-sectional view of the thermal insulation panel of this invention.

Referring now to FIG. 1, there is shown a cross-sectional view of a portion 10 of the thermal insulation panel of this invention oriented as it might be employed as the top portion of an enclosure. Thin metal walls or sheets 11 and 12 are aligned and spaced apart by pegs 14.

The spacing between the sheets is filled with high performance insulation 13 and may be any effective spacing, and any particular effective spacing arrangement is a judgment which can be made by one skilled in the art. In general, the wider the spacing between the metal sheets, the greater will be the heat resistance of the panel but also the greater will be the size, weight and material cost of the panel.

The sheets have a thickness of from 0.07 to 2.5 milliliters and preferably from 0.25 to 0.50 millimeters. It is important that the thickness of the sheets not exceed the upper value of the thickness range so that the sheets have sufficient flexibility when subjected to a large temperature gradient to allow them to accommodate the stress imposed by such gradient without breaking or permanently deforming the pegs. The lower limit of the sheet thickness is to assure at least a minimum amount of structural integrity to the panel.

The sheets are made of metal so as to provide a vacuum barrier, to assure sufficient expansion or contraction when subjected to temperatures substantially different from ambient, to insure the requisite flexibility to accommodate the above described stress, and to enable the sheets to withstand the high temperatures of a high temperature battery. Among the metals suitable for use in the thermal insulation panel of this invention, one can name stainless steel, carbon steel, aluminum and the like.

The thin metal sheets are spaced apart and supported by pegs 14 which combine excellent strength, for the attainment of good load bearing capability, with minimal increase in heat conductance. This combination of excellent strength with minimal heat transfer increase is attained by the use of a specified process to produce the pegs.

The pegs are produced from glass fiber sheets which are well-known and commercially available.

The sheets are typically made up of criss-cross glass fibers which are in the same plane. A sheet may be made up of several layers of such glass fibers. One commercial designation for such sheets is Manniglas 1400 produced by Manning Paper Company.

The diameter of the glass fibers which make up these glass fiber sheets can be from 0.2 to 13 microns and preferably is from 1 to 5 microns. The glass fiber sheets may also contain an opacifier such as titanium dioxide powder which serves to reduce radiative heat transfer through the glass fiber sheet.

The glass fiber sheets also generally contain a binder to hold the individual fibers together in sheet form. The binder may be a common commercial adhesive and is usually polyvinyl alcohol (PVA). It is important that this binder material be essentially completely removed from the glass fiber sheets for the attainment of the maximum benefits of this invention. The binder material, if present, may be removed prior to or during the process of making the pegs useful in this invention. One way of removing the binder material from the glass fiber sheets is to heat the sheets at a temperature equal to or up to 400° F. less than the glass strain temperature for a time sufficient to bake out essentially all of the binder material in the glass fiber sheets. For most conventional commercially available glass fiber sheets which contain binder material, such a procedure takes from 2 to 16 hours and generally takes about 4 hours.

The glass fiber sheets are stacked in an amount sufficient to achieve an insulation peg having the desired density of from 30 to 80 pounds per cubic foot (pcf). The desired density for any particular peg will vary depending on the load the peg is anticipated to support. Preferably the insulation peg density is from 35 to 65 pcf. A peg having a density of less than 30 psf would not have sufficient compressive strength to support non-load bearing insulation under significant load conditions while a peg having a density exceeding 80 pcf would have unacceptably high heat leak and thus defeat the purpose of the high performance non-load bearing insulation.

The press which is useful for producing the peg useful in this invention is any device which can impart a compressive force vertically to the stack of glass fiber sheets. The press can be quite simple such as a weight placed upon the stack, or it may be more complicated such as a mechanical or electro-mechanical device for imparting pressure. It is important to the successful practice of this invention that the stack of glass fiber sheets be in thermal equilibrium with at least the surface of the press when the light vertically compressive force is applied and that such thermal equilibrium be at a temperature in the range of from the glass strain temperature to less than the glass softening temperature. Such thermal equilibrium can be achieve by placing the stack in the press and heating them together, or by heating the press and the stack separately, for some or all of the time required to reach the desired compressing temperature within the defined range, before bringing them together. The binder removal step may conveniently be done during the heating step wherein the stack of glass fiber sheets is brought from ambient temperature to the desired compressing temperature.

As mentioned above, the temperature at which the stack and compressing means are in thermal equilibrium when the light vertically compressive force is applied is from the glass strain temperature to less than the glass softening temperature. Preferably this desired compressing temperature is from at least 100° F. above the glass strain temperature to not greater than 200° F. below the glass softening temperature. A particularly preferred compressing temperature is the glass annealing temperature. Thermal equilibrium of the stack and the press during compression at a temperature of at least at the lower defined limit is important. In this way, shear stresses due to differential thermal expansion do not form, so the structural integrity of the peg is not compromised. The upper temperature limit is also important in minimizing the finshed peg thermal conductivity. Deformation of the glass fibers resulting in increased fiber to fiber contact area will occur when the temperature exceeds the glass softening temperature. It is necessary only that the press surface be in thermal equilibrium with the stack though, of course, it is possible that the entire press be in such thermal equilibrium.

When the stack and the compressing means are in thermal equilibrium at the desired compressing temperature, a light vertically compressive force of from 2.0 to 20.0 psi, preferably from 3.0 to 10.0 psi, is applied to the stack by the press. This light compressive force is very important in minimizing the deformation of the glass fibers. The compressive force which does not exceed 20.0 psi and preferably does not exceed 10.0 psi is considerably smaller than that heretofore employed and taught for the compression of glass sheets. As a result of the use of the light compressive force taught herein, fewer glass fibers are damaged or broken. Broken fibers tend to stick up or orient themselves at right angles to the rest of the fibers, resulting in increased thermal conductivity. This is because thermal insulation pegs achieve maximum insulation when the glass fibers are oriented perpendicular to the direction of heat leak. Any broken fibers which are perpendicular to the bulk of the other fibers would serve as a heat conduction pathway and thus lessen the insulating effectiveness of the peg. The light compressive force is also more conducive to maintaining only point contact between glass fibers.

The specified light compressive force at the specified temperature, results in a high density insulation peg which is capable of bearing a significant load and which has a minimum of glass fibers broken or damaged. This maximizes the glass fibers which can be oriented perpendicular to the direction of heat leak and thus significantly increase the thermal resistance of the peg relative to that achievable by heretofore available pegs capable of supporting a significant load.

The glass fiber stack is heated under the specified light compressive force for a time period which enables on to compress the stack to attain a high density insulation peg of the desired density and also allow the compressed glass fiber stack to have a generally uniform temperature so as to relieve the stresses caused by compression to the desired density. This time period can be from 2 to 16 hours and generally is about 4 hours.

When the desired density and requisite temperature uniformity are attained, the stack is cooled to ambient temperature. The rate of cooling is not of particular importance, although very rapid cooling, such as by quenching, might cause damage from thermal shock. The stack may be cooled within or removed from the press.

One may produce the insulation pegs useful in this invention one at a time. However, it is preferable that the stacked glass fiber sheets be of sufficient surface area to allow a number of pegs to be made at one time from a single pressing. In such a situation the cooled compressed glass fiber stack would then be cut into a plurality of pegs. Furthermore, the insulation pegs useful in this invention may be produced in batch or continuously in a continuous feed oven. When produced in batch, the preferred procedure is to stack glass fiber sheets in a press and to heat them together to equilibrate at the desired temperature prior to compression. In a continuous process, such as in a continuous feed oven, the preferred method would entail preheating and keeping a number of presses in the oven at the desired compressing temperature, loading a stack of glass fiber sheets into a press at one point of the continuous oven, bringing the stack up to the temperature of the press and into thermal equilibrium with it, and then compressing the stack by applying the light vertically compressive force.

The high density insulation peg useful in this invention contains essentially no binder material and the glass fibers are not sintered in order to hold them together. Instead, the glass fibers are compressed together to form the high density peg capable of supporting a significant load, but retain sufficient discreteness to provide excellent heat transfer resistance.

As discussed above, the pegs are oriented such that the individual glass fiber sheets are perpendicular to the direction of the heat leak, i.e, they are parallel to the metal sheets.

The pegs contact the metal sheets over an area of from 4 to 30 percent, preferably from 8 to 15 percent, of the metal sheet surface area. A contact area exceeding the specified upper limit would unduly increase heat transfer while not significantly increasing load bearing capacity. The pegs of this invention have sufficient strength so as to support the metal sheets with only the specified small contact area. The lower limit of contact area is to insure at least a minimum of support.

The thin metal walls are allowed to deform slightly between pegs to form expansion joints. The expansion joints are necessary to allow for the change in dimension of the metal wall during use of the panel when the temperature of one wall deviates greatly from ambient, e.g. when one wall is heated. Because peg thermal conductivity is substantially greater than that of the high performance insulation it supports, the total peg support area should be no greater than the minimum required to carry the load. If peg diameter is large, i.e. if the required load support area is divided among relatively few pegs, the metal sheets must be relatively thick so that they do not deform excessively between pegs and compress the insulation, which compression would greatly reduce the performance of the insulation. However, thick walls would cause the panel to be overly heavy. If the walls are very thin, the pegs must be closely spaced to prevent insulation compression. Since total peg support area remains the same, peg diameter decreases, but pegs of very small diameter may not be stable. A peg spacing optimization, within the capabilities of one skilled in the art, must therefore be made.

Figure 2:
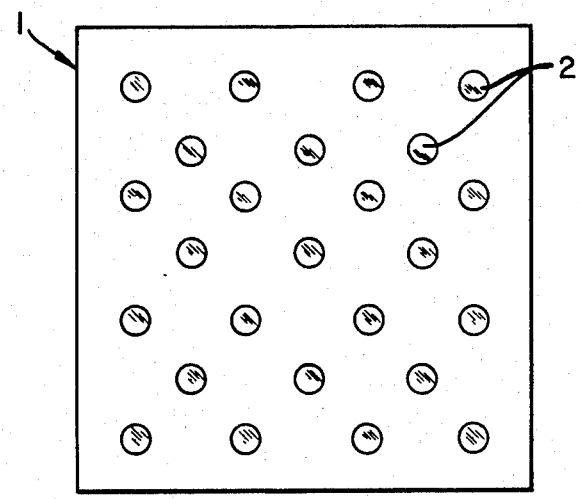
FIG. 2 is a representation showing the surface area of a sheet and the area supported by the pegs.

FIG. 2 is a representation showing the surface area of a sheet and the area supported by the pegs. As shown in FIG. 2, metal sheet 1 is supported, in this embodiment, by twenty-five pegs 2 and the peg support area is the sum total of the shaded areas representing the pegs.

The remainder of the space between the thin metal walls is filled with high performance insulation. A particularly preferred high performance insulation is what is commonly referred to in the industry as Superinsulation. This Superinsulation is made up of alternating layers of conduction resistance spacer material and radiation inhibiting foil.

Among suitable conduction resistance spacers one can name any fibrous paper or woven cloth made of glass, quartz, alumina, zirconia, or a high temperature organic fiber such as a polyamide.

Among suitable radiation inhibiting foil one can name aluminum, nickel, copper, molybdenum or other metal depending on the operating temperature of the panel.

When the Superinsulation is employed in his invention, it is generally present at a layer density of from 40 to 150 layers per inch, and preferably from 90 to 130 layers per inch. The insulating performance of the panel may also slightly improve by varying the layer density with distance from one wall, so that thermal conductivity is minimized at each point. It is, of course, recognized that suitably shaped and spaced holes are made in the insulation to accommodate the peg supports.

The insulating capability of the thermal insulation panel of this invention is enhanced when the space between the thin metal walls is evacuated, preferably to a pressure less than 1000 microns of mercury, most preferably to a pressure less than 100 microns of mercury.

The thermal insulation panel of this invention constructed primarily of lightweight nonload bearing high performance insulation, having thin metal walls supported over only a limited area by high strength pegs, is quite light weight. Generally the density of the insulation within the panel of this invention will be from 5 to 18 pcf.

Although the thermal insulation panel of this invention is particularly suitable for use at elevated temperatures, it may also be advantageously employed to insulate sub-ambient, i.e., cryogenic conditions. When ambient or cryogenic use is intended, the thin sheets need not be metal and may be impermeable plastic, coated plastic, or other suitable material.

The thermal insulation panel of this invention is further illustrated by the following example which is offered for illustrative purposes and is not intended to be limiting.

EXAMPLE 1

A one inch thick panel was constructed using 50 pcf pegs of this invention. The pegs had a diameter of 0.625 inch and were spaced two inches apart. The panel walls were 0.01 inch thick and were made of 347 stainless steel. High performance SI-62 insulation was used to complete the panel, making the total insulation density 11 pcf.

The panel was structurally tested by heating to 900° F. with a load of 200 psi on the pegs. The panel withstood the thermal cycle and was determined to be structurally sound. The panel's thermal conductivity was only $6.0 \times 10^{-4}$ BTU/hr.ft.° F.

The thermal insulation panel of this invention simultaneously solves a number of problems which have heretofore existed. No heretofore available thermal insulation panel adequately addresses all of these problems.

The panel has excellent heat transfer resistance because it is made primarily of high performance insulation supported by high density glass fiber pegs containing no binder. The pegs are made such that very few glass fibers are oriented at right angles to the majority thereby maximizing peg thermal resistance by allowing one to orient the peg fibers perpendicular to the heat leak direction. The maximum peg strength allows a miminum of panel surface area to be directly contacted by the pegs thereby further reducing heat transfer through the panel.

The panel has excellent flexibility so as to accommodate stress caused by a large temperature gradient across the panel. The flexibility is achieved by the thin metal walls which can easily expand and contract, and by the high strength pegs which can be of relatively small cross sectional diameter and judiciously spaced over the metal wall surface.

The panel has excellent load bearing capacity because the pegs have a high density without a great increase in heat conductance. This is a result of the excellent glass fiber orientation of the pegs.

The panel is very light weight. This is due to the use of lightweight high performance insulation, the walls of thin metal, and the small surface area which must be directly contacted by the high density pegs.

We claim:

1. An insulation panel suitable for use to insulate a high temperature enclosure comprising two spaced, aligned, thin metal sheets of identical surface area, said metal sheets spaced by a plurality of insulation pegs having no external stabilizing means, having a density of from 30 to 80 pounds per cubic foot and produced by a process comprising:
   (a) providing a stack of substantially binderless glass fiber sheets in an amount sufficient to achieve an insulation peg of desired density from 30 to 80 pounds per cubic foot;
   (b) providing a press to compress the stack;
   (c) heating the stack and the press to a temperature in the range of from the glass strain temperature to less than the glass softening temperature for a time period sufficient to achieve thermal equilibrium of the stack and the press surface;
   (d) thereafter compressing the stack by applying a light vertically compressive force of from 2.0 to 20.0 pounds per square inch to the stack for a time period sufficient to produce said desired density and to substantially relieve stress within the compressed stack;
   (e) cooling the compressed glass fiber stack to ambient temperature;
said pegs covering from 4 to 30 percent of said surface area and oriented such that the glass fibers are parallel to said metal sheets, with the remaining space between said metal sheets filled with high performance insulation.

2. The panel of claim 1 wherein said metal sheets are comprised of stainless steel.

3. The panel of claim 1 wherein said metal sheets have a thickness of from 0.07 to 2.5 millimeters.

4. The panel of claim 1 wherein said pegs cover from 8 to 15 percent of the metal sheet surface area.

5. The panel of claim 1 wherein the space between the metal sheets is evacuated to a pressure of less than 1000 microns of mercury.

6. The panel of claim 1 having an insulation density of from 5 to 18 pounds per cubic foot.

7. The panel of claim 1 wherein the high performance insulation comprises alternating layers of conduction resistant spacer material and radiation inhibiting foil.

8. An insulation panel suitable for use to insulate a high temperature enclosure comprising two spaced, aligned, thin metal sheets of identical surface area, said metal sheets spaced by a plurality of insulation pegs having no external stabilizing means, having a density of from 30 to 80 pounds per cubic foot comprised of non-sintered glass fibers and essentially devoid of binder material, said pegs covering from 4 to 30 percent of said surface area and oriented such that the glass fibers are parallel to said metal sheets, with the remaining space between said metal sheets filled with high performance insulation.

9. The panel of claim 8 wherein said metal sheets are comprised of stainless steel.

10. The panel of claim 8 wherein said metal sheets have a thickness of from 0.07 to 2.5 millimeters.

11. The panel of claim 8 wherein said pegs cover from 8 to 15 percent of the metal sheet surface area.

12. The panel of claim 8 wherein the space between the metal sheets is evacuated to a pressure of less than 1000 microns of mercury.

13. The panel of claim 8 having an insulation density of from 5 to 18 pounds per cubic foot.

14. The panel of claim 8 wherein the high performance insulation comprises alternating layers of conduction resistant spacer material and radiation inhibiting foil.

* * * * *